United States Patent
Sahasi et al.

(10) Patent No.: US 12,081,618 B2
(45) Date of Patent: *Sep. 3, 2024

(54) COMMUNICATION CONSOLE WITH COMPONENT AGGREGATION

(71) Applicant: ON24, INC., San Francisco, CA (US)

(72) Inventors: Jayesh Sahasi, Los Altos, CA (US); Brent Rojas, San Ramon, CA (US)

(73) Assignee: ON24, INC., San Francisco, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/902,093

(22) Filed: Sep. 2, 2022

(65) Prior Publication Data

US 2023/0007076 A1    Jan. 5, 2023

Related U.S. Application Data

(63) Continuation of application No. 16/995,404, filed on Aug. 17, 2020, now Pat. No. 11,438,410, which is a
(Continued)

(51) Int. Cl.
*H04L 67/104* (2022.01)
*G06F 8/38* (2018.01)
(Continued)

(52) U.S. Cl.
CPC ............ *H04L 67/104* (2013.01); *H04L 51/10* (2013.01); *H04L 67/1091* (2013.01);
(Continued)

(58) Field of Classification Search
CPC ... H04L 67/104; H04L 51/10; H04L 67/1091; H04L 67/34; H04L 67/02; G06F 8/38
See application file for complete search history.

(56) References Cited

U.S. PATENT DOCUMENTS

| 5,220,665 A | 6/1993 | Coyle., Jr. et al. |
| 5,388,197 A | 2/1995 | Rayner |

(Continued)

FOREIGN PATENT DOCUMENTS

| CN | 1500353 A | 5/2004 |
| CN | 103535026 A | 1/2014 |

(Continued)

OTHER PUBLICATIONS

Abla et al., Advanced Tools for enhancing control room collaborations, Fusion Engineering and Design, vol. 81, Issues 15-17, 5th IAEA TM on Control, Data Acquisition, and Remote Participation for Fusion Research—5th IAEA TM, Jul. 2008, pp. 2039-2044 (15 pages), ISSN 0920-3796, DOI: 10.1016/i.iusengdes.200.

(Continued)

*Primary Examiner* — Minh Chau Nguyen
(74) *Attorney, Agent, or Firm* — Manatt, Phelps & Phillip, LLP

(57) ABSTRACT

Systems methods and devices are provided for a presentation including a communications console with component aggregation. In one potential implementation, a computing device with an application framework receives a communication manager object via a network connectivity device and executes the communication manager object within the application framework. The computing device may then receive and execute communications components and a presentation components within the application framework using the communication manager object. The communication manager object may then manages interface and display of the presentation information via the application framework, as modified by communication components.

20 Claims, 11 Drawing Sheets

Related U.S. Application Data continuation-in-part of application No. 15/979,372, filed on May 14, 2018, now Pat. No. 10,749,948, which is a continuation of application No. 14/850,556, filed on Sep. 10, 2015, now Pat. No. 9,973,576, which is a continuation of application No. 14/257,914, filed on Apr. 21, 2014, now Pat. No. 9,148,480, which is a continuation of application No. 12/755,849, filed on Apr. 7, 2010, now Pat. No. 8,706,812.

(51) Int. Cl.
*H04L 51/10* (2022.01)
*H04L 67/00* (2022.01)
*H04L 67/02* (2022.01)
*H04L 67/1087* (2022.01)

(52) U.S. Cl.
CPC ............... *H04L 67/34* (2013.01); *G06F 8/38* (2013.01); *H04L 67/02* (2013.01)

(56) References Cited

U.S. PATENT DOCUMENTS

| | | | |
|---|---|---|---|
| 5,420,801 | A | 5/1995 | Dockter et al. |
| 5,557,796 | A | 9/1996 | Fehskens et al. |
| 5,642,171 | A | 6/1997 | Baumgartner et al. |
| 5,680,619 | A | 10/1997 | Gudmundson et al. |
| 5,732,216 | A | 3/1998 | Logan et al. |
| 5,748,185 | A | 5/1998 | Stephan et al. |
| 5,752,244 | A | 5/1998 | Rose et al. |
| 5,801,685 | A | 9/1998 | Miller et al. |
| 5,815,154 | A | 9/1998 | Hirschtick et al. |
| 5,838,973 | A | 11/1998 | Carpenter-Smith et al. |
| 5,861,906 | A | 1/1999 | Dunn et al. |
| 5,892,915 | A | 4/1999 | Duso et al. |
| 5,929,850 | A | 7/1999 | Broadwin et al. |
| 5,996,015 | A | 11/1999 | Day et al. |
| 6,006,332 | A | 12/1999 | Rabne et al. |
| 6,008,807 | A | 12/1999 | Bretschneider et al. |
| 6,009,458 | A | 12/1999 | Hawkins et al. |
| 6,014,706 | A | 1/2000 | Cannon et al. |
| 6,058,424 | A | 5/2000 | Dixon et al. |
| 6,097,441 | A | 8/2000 | Allport |
| 6,108,645 | A | 8/2000 | Eichstaedt et al. |
| 6,141,595 | A | 10/2000 | Gloudeman et al. |
| 6,155,840 | A | 12/2000 | Sallette |
| 6,157,809 | A | 12/2000 | Kaqmbayashi |
| 6,223,292 | B1 | 4/2001 | Dean et al. |
| 6,253,368 | B1 | 6/2001 | Nelin et al. |
| 6,324,683 | B1 | 11/2001 | Fuh et al. |
| 6,366,916 | B1 | 4/2002 | Baer et al. |
| 6,396,500 | B1 | 5/2002 | Qureshi et al. |
| 6,404,978 | B1 | 6/2002 | Abe |
| 6,443,834 | B1 | 9/2002 | Rising, III et al. |
| 6,452,609 | B1 | 9/2002 | Katinsky et al. |
| 6,473,749 | B1 | 10/2002 | Smith et al. |
| 6,523,022 | B1 | 2/2003 | Hobbs |
| 6,535,909 | B1 | 3/2003 | Rust |
| 6,538,665 | B2 | 3/2003 | Crow et al. |
| 6,546,405 | B2 | 4/2003 | Gupta et al. |
| 6,560,637 | B1 | 5/2003 | Dunlap et al. |
| 6,601,026 | B2 | 7/2003 | Appelt et al. |
| 6,628,279 | B1 | 9/2003 | Schell et al. |
| 6,629,065 | B1 | 9/2003 | Gadh et al. |
| 6,636,237 | B1 | 10/2003 | Murray et al. |
| 6,636,888 | B1 | 10/2003 | Bookspan et al. |
| 6,657,543 | B1 | 12/2003 | Chung |
| 6,697,805 | B1 | 2/2004 | Choquier et al. |
| 6,714,909 | B1 | 3/2004 | Gibbon et al. |
| 6,715,126 | B1 | 3/2004 | Chang et al. |
| 6,728,753 | B1 | 4/2004 | Parasnis et al. |
| 6,745,344 | B1 | 6/2004 | Gibbon et al. |
| 6,748,382 | B1 | 6/2004 | Mohan et al. |
| 6,795,972 | B2 | 9/2004 | Rovira |
| 6,801,224 | B1 | 10/2004 | Chang et al. |
| 6,834,308 | B1 | 12/2004 | Ikezoye et al. |
| 6,842,175 | B1 | 1/2005 | Schmalstieg et al. |
| 6,850,944 | B1 | 2/2005 | MacCall et al. |
| 6,859,838 | B1 | 2/2005 | Puranik et al. |
| 6,877,023 | B1 | 4/2005 | Maffeis et al. |
| 6,920,181 | B1 | 7/2005 | Porter |
| 7,062,722 | B1 | 6/2006 | Carlin et al. |
| 7,079,990 | B2 | 7/2006 | Haller et al. |
| 7,096,416 | B1 | 8/2006 | Smith et al. |
| 7,103,770 | B2 | 9/2006 | Conrath |
| 7,146,329 | B2 | 12/2006 | Conkwright et al. |
| 7,168,033 | B1 | 1/2007 | Bell et al. |
| 7,188,186 | B1 | 3/2007 | Meyer et al. |
| 7,281,034 | B1 | 10/2007 | Eyal |
| 7,281,060 | B2 | 10/2007 | Hofmann et al. |
| 7,290,057 | B2 | 10/2007 | Suanders et al. |
| 7,296,137 | B2 | 11/2007 | Moyer |
| 7,313,595 | B2 | 12/2007 | Rust |
| 7,330,875 | B1 | 2/2008 | Parasnis et al. |
| 7,349,944 | B2 | 3/2008 | Vernon |
| 7,350,231 | B2 | 3/2008 | Madison et al. |
| 7,363,372 | B2 | 4/2008 | Potenzone et al. |
| 7,370,269 | B1 | 5/2008 | Prabhu et al. |
| 7,415,529 | B2 | 8/2008 | Saunders et al. |
| 7,418,431 | B1 | 8/2008 | Nies et al. |
| 7,441,201 | B1 | 10/2008 | Printezis |
| 7,454,708 | B2 | 11/2008 | O'Neal et al. |
| 7,559,055 | B2 | 7/2009 | Yang et al. |
| 7,561,178 | B2 | 7/2009 | Baartman et al. |
| 7,590,945 | B2 | 9/2009 | Sims et al. |
| 7,711,722 | B1 | 5/2010 | Sahasi et al. |
| 7,712,052 | B2 | 5/2010 | Szeliski et al. |
| 7,873,638 | B2 | 1/2011 | Young et al. |
| 8,234,336 | B2 | 7/2012 | Slater et al. |
| 8,392,821 | B2 | 3/2013 | DeMarco et al. |
| 8,443,041 | B1 | 5/2013 | Krantz et al. |
| 8,447,664 | B1 | 5/2013 | Pape et al. |
| 8,682,672 | B1 | 3/2014 | Ha et al. |
| 8,682,969 | B1 | 3/2014 | Sabasi et al. |
| 8,706,812 | B2 | 4/2014 | Sahasi et al. |
| 8,798,252 | B2 | 8/2014 | Krantz et al. |
| 9,046,995 | B2 | 6/2015 | Garland |
| 9,135,312 | B2 | 9/2015 | Greenspan et al. |
| 9,148,480 | B2 | 9/2015 | Sahasi et al. |
| 9,224,173 | B2 | 12/2015 | Arora et al. |
| 9,549,152 | B1 | 1/2017 | Nayyar et al. |
| 9,553,922 | B1 | 1/2017 | Guarraci et al. |
| 9,720,577 | B1 | 8/2017 | Sahasi |
| 9,892,028 | B1 | 2/2018 | Garland |
| 9,973,576 | B2 | 5/2018 | Sahasi et al. |
| 10,430,491 | B1 | 10/2019 | Joshi et al. |
| 10,785,325 | B1 | 9/2020 | Baishya et al. |
| 2001/0027420 | A1 | 10/2001 | Boublik et al. |
| 2001/0032242 | A1 | 10/2001 | Terahama et al. |
| 2001/0032305 | A1 | 10/2001 | Barry |
| 2002/0016788 | A1 | 2/2002 | Burridge |
| 2002/0026323 | A1 | 2/2002 | Sakaguchi et al. |
| 2002/0065635 | A1 | 5/2002 | Lei et al. |
| 2002/0078130 | A1 | 6/2002 | Thompson et al. |
| 2002/0085029 | A1 | 7/2002 | Ghani |
| 2002/0087496 | A1 | 7/2002 | Stirpe et al. |
| 2002/0107673 | A1 | 8/2002 | Haller et al. |
| 2002/0112031 | A1 | 8/2002 | Franklin et al. |
| 2002/0112155 | A1 | 8/2002 | Martherus et al. |
| 2002/0112247 | A1 | 8/2002 | Horner et al. |
| 2002/0122050 | A1 | 9/2002 | Sandberg |
| 2002/0133719 | A1 | 9/2002 | Westerdal |
| 2002/0143901 | A1 | 10/2002 | Lupo et al. |
| 2002/0152278 | A1 | 10/2002 | Pontenzone et al. |
| 2002/0193895 | A1 | 12/2002 | Qian et al. |
| 2003/0004791 | A1 | 1/2003 | Kojima |
| 2003/0005019 | A1 | 1/2003 | Pabla et al. |
| 2003/0005465 | A1 | 1/2003 | Connelly |
| 2003/0014521 | A1 | 1/2003 | Elson et al. |
| 2003/0025650 | A1 | 2/2003 | Uesaki et al. |
| 2003/0037131 | A1 | 2/2003 | Verma |
| 2003/0037311 | A1* | 2/2003 | Busfield ............... G06F 8/315 717/115 |

(56) References Cited

U.S. PATENT DOCUMENTS

| | | |
|---|---|---|
| 2003/0061280 A1 | 3/2003 | Bulson et al. |
| 2003/0061330 A1 | 3/2003 | Frisco et al. |
| 2003/0071810 A1 | 4/2003 | Shoov et al. |
| 2003/0086682 A1 | 5/2003 | Schofield et al. |
| 2003/0101091 A1 | 5/2003 | Levin et al. |
| 2003/0115267 A1 | 6/2003 | Hinton et al. |
| 2003/0154277 A1 | 8/2003 | Haddad et al. |
| 2003/0156135 A1 | 8/2003 | Lucarelli |
| 2003/0167315 A1 | 9/2003 | Chowdhry et al. |
| 2003/0174160 A1 | 9/2003 | Deutscher et al. |
| 2003/0204566 A1 | 10/2003 | Dhupelia et al. |
| 2003/0208754 A1 | 11/2003 | Sridhar |
| 2004/0024898 A1 | 2/2004 | Wan |
| 2004/0030787 A1 | 2/2004 | Jandel et al. |
| 2004/0032424 A1 | 2/2004 | Florschuetz |
| 2004/0039834 A1 | 2/2004 | Saunders et al. |
| 2004/0049539 A1 | 3/2004 | Reynolds et al. |
| 2004/0054542 A1 | 3/2004 | Foote et al. |
| 2004/0059941 A1 | 3/2004 | Hardman et al. |
| 2004/0073629 A1 | 4/2004 | Bazot et al. |
| 2004/0098754 A1 | 5/2004 | Vella et al. |
| 2004/0103150 A1 | 5/2004 | Ogdon et al. |
| 2004/0125877 A1 | 7/2004 | Chang et al. |
| 2004/0143603 A1 | 7/2004 | Kaufmann et al. |
| 2004/0148375 A1 | 7/2004 | Levett et al. |
| 2004/0153504 A1 | 8/2004 | Hutchinson et al. |
| 2004/0162787 A1 | 8/2004 | Madison et al. |
| 2004/0167896 A1 | 8/2004 | Eakin |
| 2004/0187140 A1 | 9/2004 | Aigner et al. |
| 2004/0237120 A1 | 11/2004 | Lewin et al. |
| 2004/0243928 A1 | 12/2004 | Hesmer et al. |
| 2004/0268224 A1 | 12/2004 | Balkus et al. |
| 2005/0015719 A1 | 1/2005 | Marchon et al. |
| 2005/0039131 A1 | 2/2005 | Paul |
| 2005/0093860 A1 | 5/2005 | Yanagisawa et al. |
| 2005/0138560 A1 | 6/2005 | Lee et al. |
| 2005/0144258 A1 | 6/2005 | Burckart et al. |
| 2005/0183143 A1 | 8/2005 | Anderholm et al. |
| 2005/0204148 A1 | 9/2005 | Mayo et al. |
| 2005/0212797 A1 | 9/2005 | Lee et al. |
| 2005/0223340 A1 | 10/2005 | Repka |
| 2005/0223341 A1 | 10/2005 | Repka |
| 2005/0223342 A1 | 10/2005 | Repka et al. |
| 2005/0278650 A1 | 12/2005 | Sims et al. |
| 2005/0288001 A1 | 12/2005 | Foster et al. |
| 2006/0005114 A1 | 1/2006 | Williamson et al. |
| 2006/0031914 A1 | 2/2006 | Dakss et al. |
| 2006/0048038 A1 | 3/2006 | O'Neal et al. |
| 2006/0106780 A1 | 5/2006 | Degan |
| 2006/0129933 A1 | 6/2006 | Land et al. |
| 2006/0150149 A1 | 7/2006 | Chandhoke et al. |
| 2006/0167896 A1 | 7/2006 | Kapur et al. |
| 2006/0235973 A1 | 10/2006 | McBride et al. |
| 2006/0265493 A1 | 11/2006 | Butler et al. |
| 2006/0277553 A1 | 12/2006 | Henning et al. |
| 2007/0038931 A1 | 2/2007 | Allaire et al. |
| 2007/0055401 A1 | 3/2007 | Van Bael et al. |
| 2007/0121850 A1 | 5/2007 | Klos et al. |
| 2007/0174905 A1 | 7/2007 | Martherus et al. |
| 2007/0192613 A1 | 8/2007 | Amoroso et al. |
| 2007/0192727 A1 | 8/2007 | Finley et al. |
| 2007/0211065 A1 | 9/2007 | Feth et al. |
| 2007/0245243 A1 | 10/2007 | Lanza et al. |
| 2007/0271367 A1 | 11/2007 | Yardeni et al. |
| 2007/0282858 A1 | 12/2007 | Arner et al. |
| 2008/0005240 A1 | 1/2008 | Knighton et al. |
| 2008/0005247 A9 | 1/2008 | Khoo |
| 2008/0028341 A1 | 1/2008 | Szeliski et al. |
| 2008/0062969 A1 | 3/2008 | Picard et al. |
| 2008/0062970 A1 | 3/2008 | Picard et al. |
| 2008/0086456 A1 | 4/2008 | Rasanen et al. |
| 2008/0109396 A1 | 5/2008 | Kacin |
| 2008/0120336 A1 | 5/2008 | Bergman et al. |
| 2008/0162206 A1 | 7/2008 | Mak et al. |
| 2008/0189162 A1 | 8/2008 | Ganong et al. |
| 2008/0201736 A1 | 8/2008 | Gordon et al. |
| 2008/0235189 A1 | 9/2008 | Rayman et al. |
| 2008/0270151 A1 | 10/2008 | Mahoney et al. |
| 2008/0276271 A1 | 11/2008 | Anderson et al. |
| 2009/0013244 A1 | 1/2009 | Cudich et al. |
| 2009/0019367 A1 | 1/2009 | Cavagnari et al. |
| 2009/0044138 A1 | 2/2009 | Rudolph et al. |
| 2009/0049385 A1 | 2/2009 | Blinnikka et al. |
| 2009/0066366 A1 | 3/2009 | Solomon |
| 2009/0083641 A1 | 3/2009 | Christy |
| 2009/0094520 A1 | 4/2009 | Kulas |
| 2009/0094544 A1 | 4/2009 | Savage |
| 2009/0100372 A1 | 4/2009 | Lauridsen et al. |
| 2009/0132653 A1 | 5/2009 | Niazi |
| 2009/0133048 A1 | 5/2009 | Gibbs et al. |
| 2009/0138508 A1 | 5/2009 | Tolle et al. |
| 2009/0171968 A1 | 7/2009 | Kane et al. |
| 2009/0172021 A1 | 7/2009 | Kane et al. |
| 2009/0172897 A1 | 7/2009 | Mercer |
| 2009/0187825 A1 | 7/2009 | Sandquist et al. |
| 2009/0187935 A1* | 7/2009 | Pellinat ............... H04N 21/6131 725/24 |
| 2009/0217187 A1 | 8/2009 | Kendall et al. |
| 2009/0222842 A1 | 9/2009 | Narayanan et al. |
| 2009/0259937 A1 | 10/2009 | Rohall et al. |
| 2009/0287790 A1 | 11/2009 | Upton et al. |
| 2009/0292584 A1 | 11/2009 | Dalal et al. |
| 2009/0292768 A1 | 11/2009 | Franke |
| 2010/0023849 A1 | 1/2010 | Hakim et al. |
| 2010/0037205 A1 | 2/2010 | Maillot et al. |
| 2010/0057415 A1 | 3/2010 | Chu et al. |
| 2010/0189131 A1 | 7/2010 | Branam et al. |
| 2010/0192132 A1 | 7/2010 | Yuan et al. |
| 2010/0216443 A1 | 8/2010 | Jacobstein et al. |
| 2010/0241971 A1* | 9/2010 | Zuber ..................... G06F 16/93 709/204 |
| 2010/0251174 A1 | 9/2010 | Belandrino et al. |
| 2010/0277696 A1 | 11/2010 | Huebner |
| 2010/0323674 A1 | 12/2010 | Liu |
| 2010/0325674 A1 | 12/2010 | Liu |
| 2011/0004914 A1 | 1/2011 | Ennis, Jr. et al. |
| 2011/0010307 A1 | 1/2011 | Bates et al. |
| 2011/0026898 A1 | 2/2011 | Lussier et al. |
| 2011/0035431 A1 | 2/2011 | Geary et al. |
| 2011/0055176 A1 | 3/2011 | Choi et al. |
| 2011/0082719 A1 | 4/2011 | Dutta |
| 2011/0191316 A1 | 8/2011 | Lai et al. |
| 2011/0225015 A1 | 9/2011 | Spivack et al. |
| 2011/0252094 A1 | 10/2011 | Sabasi et al. |
| 2011/0276372 A1 | 11/2011 | Spivack et al. |
| 2011/0289422 A1 | 11/2011 | Spivack et al. |
| 2012/0017253 A1 | 1/2012 | Hicks, III et al. |
| 2012/0048298 A1 | 3/2012 | Humphrey et al. |
| 2012/0084292 A1 | 4/2012 | Liang et al. |
| 2012/0109966 A1 | 5/2012 | Liang et al. |
| 2012/0130771 A1 | 5/2012 | Kannan et al. |
| 2012/0158902 A1 | 6/2012 | Udtke et al. |
| 2012/0191716 A1 | 7/2012 | Omoigui |
| 2012/0210247 A1 | 8/2012 | Khouri et al. |
| 2012/0226984 A1 | 9/2012 | Bastide et al. |
| 2012/0246137 A1 | 9/2012 | Sallakonda et al. |
| 2012/0254454 A1 | 10/2012 | Margush et al. |
| 2012/0290399 A1 | 11/2012 | England et al. |
| 2012/0290950 A1 | 11/2012 | Rapaport et al. |
| 2012/0310750 A1 | 12/2012 | Schutzbank et al. |
| 2013/0036191 A1 | 2/2013 | Fink et al. |
| 2013/0132374 A1 | 5/2013 | Olstad et al. |
| 2013/0138585 A1 | 5/2013 | Forte |
| 2013/0215116 A1 | 8/2013 | Siddique et al. |
| 2013/0268872 A1 | 10/2013 | Yin et al. |
| 2013/0282611 A1 | 10/2013 | Avedissian et al. |
| 2014/0006975 A1 | 1/2014 | Oldham et al. |
| 2014/0068779 A1 | 3/2014 | Tan et al. |
| 2014/0115466 A1 | 4/2014 | Barak et al. |
| 2014/0123014 A1 | 5/2014 | Keen |
| 2014/0126714 A1 | 5/2014 | Sayko |
| 2014/0126715 A1 | 5/2014 | Lum et al. |
| 2014/0136528 A1 | 5/2014 | Anima et al. |
| 2014/0214691 A1 | 7/2014 | Morris, III |

(56) References Cited

U.S. PATENT DOCUMENTS

| | | | |
|---|---|---|---|
| 2014/0229839 A1 | 8/2014 | Lynch et al. |
| 2014/0237381 A1 | 8/2014 | Socolof |
| 2014/0279049 A1 | 9/2014 | Wiseman et al. |
| 2014/0289326 A1 | 9/2014 | McCormack et al. |
| 2014/0366098 A1 | 12/2014 | Savage et al. |
| 2014/0372468 A1 | 12/2014 | Collins et al. |
| 2015/0002619 A1 | 1/2015 | Johnston et al. |
| 2015/0006610 A1 | 1/2015 | Johnston et al. |
| 2015/0082021 A1 | 3/2015 | Mandyann et al. |
| 2015/0213145 A1 | 7/2015 | Baldwin et al. |
| 2015/0213361 A1 | 7/2015 | Gamon et al. |
| 2015/0278363 A1 | 10/2015 | Briere et al. |
| 2015/0304367 A1 | 10/2015 | Chan et al. |
| 2015/0365244 A1 | 12/2015 | Schmiltz et al. |
| 2016/0011729 A1 | 1/2016 | Flores et al. |
| 2016/0028790 A1 | 1/2016 | Eriksson et al. |
| 2016/0180248 A1 | 6/2016 | Regan |
| 2017/0046374 A1 | 2/2017 | Fletcher et al. |
| 2017/0064358 A1 | 3/2017 | Sullivan et al. |
| 2017/0097743 A1 | 4/2017 | Hameed et al. |
| 2017/0140398 A1 | 5/2017 | Fleischman et al. |
| 2017/0243255 A1 | 8/2017 | Sakasi et al. |
| 2017/0255696 A1 | 9/2017 | Pulitzer |
| 2018/0033051 A1 | 2/2018 | Maynard et al. |
| 2018/0211285 A1 | 7/2018 | Todasco et al. |
| 2018/0262361 A1 | 9/2018 | Sahasi et al. |
| 2018/0293610 A1 | 10/2018 | Maynard |
| 2018/0315103 A1 | 11/2018 | Lakshminarayan et al. |
| 2019/0108234 A1 | 4/2019 | Torres et al. |
| 2019/0108438 A1 | 4/2019 | Torres et al. |
| 2020/0267110 A1 | 8/2020 | Nolan et al. |
| 2020/0382583 A1 | 12/2020 | Sahasi et al. |

FOREIGN PATENT DOCUMENTS

| | | | |
|---|---|---|---|
| EP | 2261898 A1 | 12/2010 |
| KR | 20100003117 A | 1/2010 |
| WO | WO02082815 A1 | 10/2002 |
| WO | WO02093352 A1 | 11/2002 |
| WO | WO02097616 A1 | 12/2002 |
| WO | WO2009020770 A1 | 2/2009 |
| WO | WO2017109748 A1 | 6/2017 |

OTHER PUBLICATIONS

Guthery et al. - "How to turn a GSM SIM into a web server" projecting mobile trust onto the Worldwide Web-In Proceedings of the Fourth Working Conference on Smart Card Research and Advanced Applications on Smart Card Research and Advanced Applications, Bristol, United Kingdom (13 pages).
Holmberg et al., "Web Real-Time Communication Use Cases and Requirements"; Internet Engineering Task Force (IETF), dated Mar. 2015 (29 pages).
Draft -C., Holmberg et al., "Web Real-Time Communication Use Cases and Requirements", RTCWEV Working Group, dated Oct. 14, 2013 (25 pages).
Saint-Andre, P. 2005. Streaming XML with Jabber/XMPP. IEEE Internet Computing 9, Apr. 27, 2005, 6 pages. (Sep. 2005).
Sen, Sandip, "An Automated Distributed Meeting Scheduler, PSU," Apr. 2007, 13 pages. http//citeseerx.ist.psu.edu/viewdoc/summary?doi=10.1.1.56.6862.
Sinha et al., "Video Conferencing System," Columbia University, 11 pages. http://www.cs.columbia.edu/~sedwards/classes/2009/4840/reports/RVD-presentation.pdf.
On24 "Best practices in Webcasting for Publishing" dated 2006, 16 pages.
Weiser, "Microsoft PowerPoint 2003—Table of Contents, ITM Online Help Collection, UWEC," University of Wisconsin, Eau Claire entitled dated Sep. 19, 2004, (2 pages). archived located @ http://web.archive.org/web/20040919191008/http://www.uwec.edu/help/ppoint03.htm.
Weiser, Microsoft PowerPoint 2003 Viewing Online Presentations: The Environment, UWEC—University of Wisconsin, Eau Claire archived dated Dec. 21, 2004, (2 pages). http://web.archive.org/web/20041211201404/www.uwec.edu/help/PPoint03/webenvir.htm.
Microsoft Corporation—"COM: Component Object Model Technologies" —archived dated Oct. 23, 2004, 2 pages. http://web.archive.org/web/20041023025124/http:www.microsoft.com/com/default.mspx.
Rothganger et al., "3D Object Modeling and Recognition Using Local Affine-Invariant Image Descriptors and Multi-View Spatial Constraints," Department of Computer Science and Beckman Institute, University of Illinois-Cordelis Schmid Inria, France-International Journal of Computer Vision 66(3), 231-259, 2006 (29 pages).
Papadakis et al., "Efficient 3D shape matching and retrieval using a concrete radialized spherical projection representation"—The Journal of the Pattern Recognition Society 40 dated 2007 p. 2437-2452 (16 pages).
"Breeze Manager User Guide," Copyright@ 2005 Macromedia, Inc., Second Edition: Jun. 2005, 306 pages.
"Breeze Meeting User Guide for Meeting Hosts and Presenters", Copyright@ 2005 Macromedia, Inc., Third Edition: Sep. 2005, 130 pages.
Freeman et al., "Creative Collaboration between Audiences and Musicians in Flock," Georgia Tech Center for Music Technology, Feb. 2010, 17 pages. http://distributedmusic.gatech.edu/jason/publications/pdf_files_of_publications/flock-digitalcreativity.pdf.
Suduc et al., "Exploring Multimedia Web Conferencing," Valahia University of Targoviste, Exploring Multimedia Web Conferencing (Year: 2009), Mar. 2009, 14 pages https://www.researchgate.net/profile/Suduc Ana-Maria/publication/26849386.
Marni Gunther, "Webcasting 101: Online Broadcasting in the Meetings and Events Industry", Netbriefings, Inc., Jul. 2008, 2 pages. http//www.netbriefings.com/pdf/0807-MtgsMNHospitality.pdf.
Aguiar, Everaldo, et al. "Engagement vs performance: using electronic portfolios to predict first semester engineering student retention." Proceedings of the Fourth International Conference on Learning Analytics and Knowledge. 2014: 103-112 (year: 2014), 10 pages.
Navarantha, Rajitha, et al. "Estimating audience engagement to predict movie ratings." IEEE Transactions on Affective Computing 10.1 (Jul. 3, 2017): 48-59., 12 pages.
Dutton, Sam, "Get Started with WebRTC", published Jul. $23^{rd}$, 2012 (updated Nov. 24, 2020) 24 pages. https://www.html5rocks.com/en/tutorials/webrtc/basics/.
Ebner, et al., "First Steps Towards an Integration of a Personal learning Environment at University level", (Year: 2011), 2011, 16 pages.
Berthold, et al, "Psycho-pedagogical Mash-Up Design for Personalizing the Learning Environment", Knowledge Management Institute, Graz University of Technology, Austria, Jul. 11, 2011, 15 pages.
First Chinese Office Action, CN/201180028271.2, dated Feb. 17, 2015, 25 pages.

* cited by examiner

COMMUNICATION CONSOLE WITH COMPONENT AGGREGATION

RELATED APPLICATIONS/PRIORITY CLAIMS

This application is a continuation and claims priority under 35 USC 120 to U.S. application Ser. No. 16/995,404, filed Aug. 17, 2020 (now U.S. Pat. No. 11,438,410 that issued on Sep. 6, 2022) that is a continuation in part and claims priority under 35 USC 120 to U.S. patent application Ser. No. 15/979,372, filed May 14, 2018 (now U.S. Pat. No. 10,749,948 that issued Aug. 18, 2020) that in turn is a continuation of and claims priority under 35 USC 120 to U.S. patent application Ser. No. 14/850,556, filed Sep. 10, 2015 and entitled "Communication Console With Component Aggregation" (now U.S. Pat. No. 9,973,576 issued on May 15, 2018) that in turn in a continuation of and claims priority under 35 USC 120 to U.S. patent application Ser. No. 14/257,914, filed on Apr. 21, 2014 and titled "Communication console with component aggregation" (now U.S. Pat. No. 9,148,480 issued Sep. 29, 2015) that is in turn a continuation of and claims priority under 35 USC 120 to U.S. patent application Ser. No. 12/755,849, filed on Apr. 7, 2010 (now U.S. Pat. No. 8,706,812 issued Apr. 22, 2014) and entitled "Communication Console With Component Aggregation", the entirety of all of which are incorporated herein by reference.

FIELD

The present invention relates to online communications applications.

BACKGROUND

Currently, numerous structures exist for direct online communications. The current solutions for providing interactivity and user control, however, are limited in the amount of user control that they provide for an audience member. These online communications applications limit flexibility, integration, and user selections in a variety of ways in order to streamline and limit the size and complexity of the application.

For example, current direct online applications limit flexibility by restricting the amount of customization that can be achieved within an individual communications component. None of the existing direct online platforms use a completely separate, encapsulated architecture for implementing communications component customization per web cast, and none of them allow an audience member to set up and view a webcast per their own interests. They also limit integration by restricting the amount of interactivity provided to a highly-customized communications. For example, existing webcasting platforms do not have an open platform for integrating third-party communications components of any significant size or complexity. The integration of third-party communications components in communication applications are limited in direct communications to simple image or animation components. Attempts to expand flexibility in current solutions involve creation of a collection of closed "widgets" which become the non-expandable limitations of the application.

Downloaded executable installed applications do exist currently that use a component model, but the requirement to download, execute, and install a desktop executable application in a client computer make the current use of these indirect executable applications less secure and more cumbersome from an initial use perspective. None of the existing applications function in a context that is fully-online, without a downloaded desktop application.

SUMMARY

In one potential implementation, flexibility of the application is increased by using completely separate, encapsulated architecture for implementing communications component customization per web cast, and none of them allow an audience member to set up and view a webcast per their own interests.

In another potential implementation, integration is increased by using an open platform for integrating third-party communications components of any significant size or complexity. Another potential implementation targets each communications component in the direct application as being a fully self contained piece of the whole system, relying on the platform to provide common services, but able to function independently if needed. So not only is the service layer accessible to communications components, but also the look and feel of the communications components themselves is inherited from the parent platform, without the need for an unsafe executed application.

BRIEF DESCRIPTION OF THE DRAWINGS

FIG. 3a is an illustration of one aspect of a rich internet application component according to one aspect of the innovations herein.

FIG. 3b is an illustration of one aspect of a rich internet application component according to one aspect of the innovations herein.

DETAILED DESCRIPTION OF ONE OR MORE EMBODIMENTS

Reference will now be made in detail to the present innovations, examples of which are illustrated in the accompanying drawings. The implementations set forth in the following description do not represent all implementations consistent with the claimed present innovations.

Instead, they are merely some examples consistent with certain aspects related to the present innovations. Wherever possible, the same reference numbers will be used throughout the drawings to refer to the same or like parts. The present innovations are relevant in the field of online communications applications. Although one embodiment may use live audio and video presentations that have a great deal of interactivity and user control, a live or on-demand stream is not a necessary communications component. Embodiments of the innovations herein may function with or without an audio or video stream depending on the specific implementation. Certain embodiments of the present innovations may be a collection of other pieces of functionality, or communications components that interact and collaborate with each other using a common underlying open platform. Again, this may occur with or without live audio and video elements.

Figure 1:
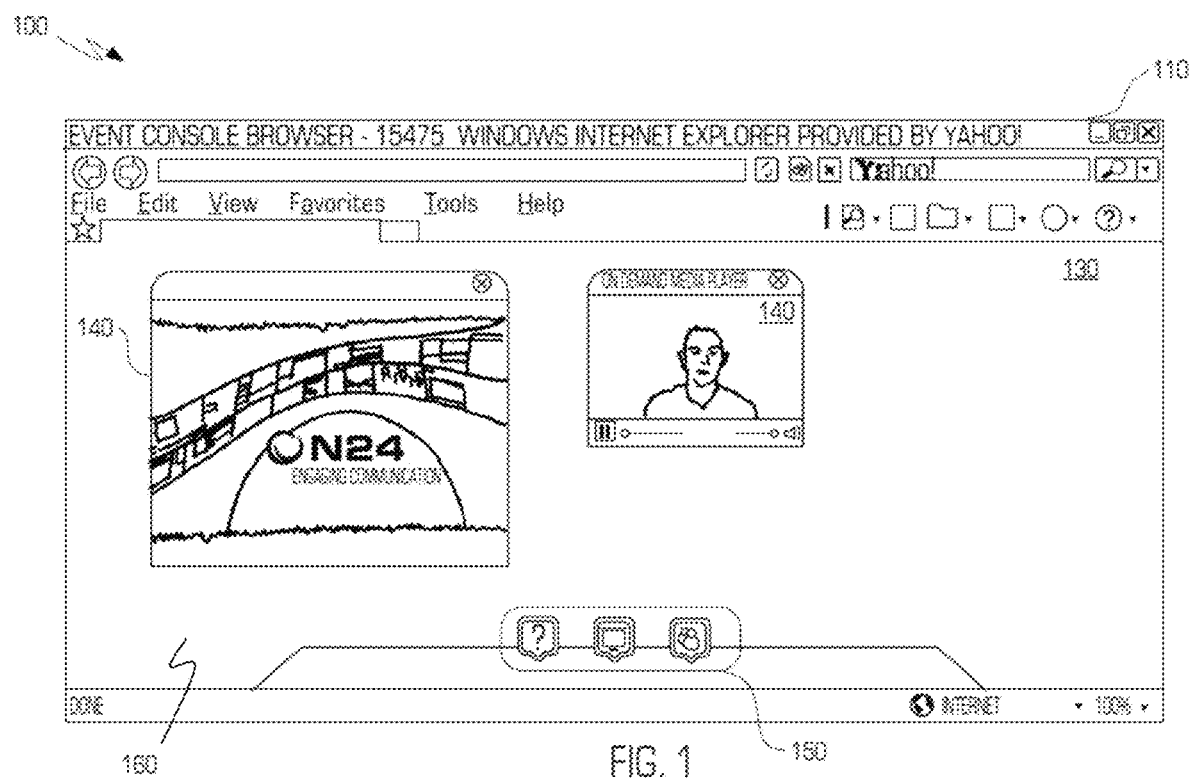
FIG. 1 is an application interface according to one aspect of the innovations herein.

FIG. 1 shows a collection of communication components such as slide communications component 120, media communications component 130, and menu ribbon component 150 which are aggregated into an event console 100. Console 100 may include an unlimited number of components, additionally including components such as display background component 140 and screen background 160. In at least one potential embodiment, event console 100 functions only within the internet browser 110 of a computing system, such as Windows Internet Explorer™. The event console is created within the internet browser 110 using browser plugins in conjunction with a standardized plugin system such as Adobe Flash™ or Microsoft Silverlight™ as an enabler. The plugins are not a required component of this solution, since a fully-browser based version (based on HTML5) is also implemented. This allows console 100 to function in many standardized environments without the need to download and install a desktop application, with the console 100 functioning inside the browser 110, and components 120-150 functioning inside console 100. Additional details related to the structure and function of communication components aggregated within console 100 will be described below.

Figure 2:
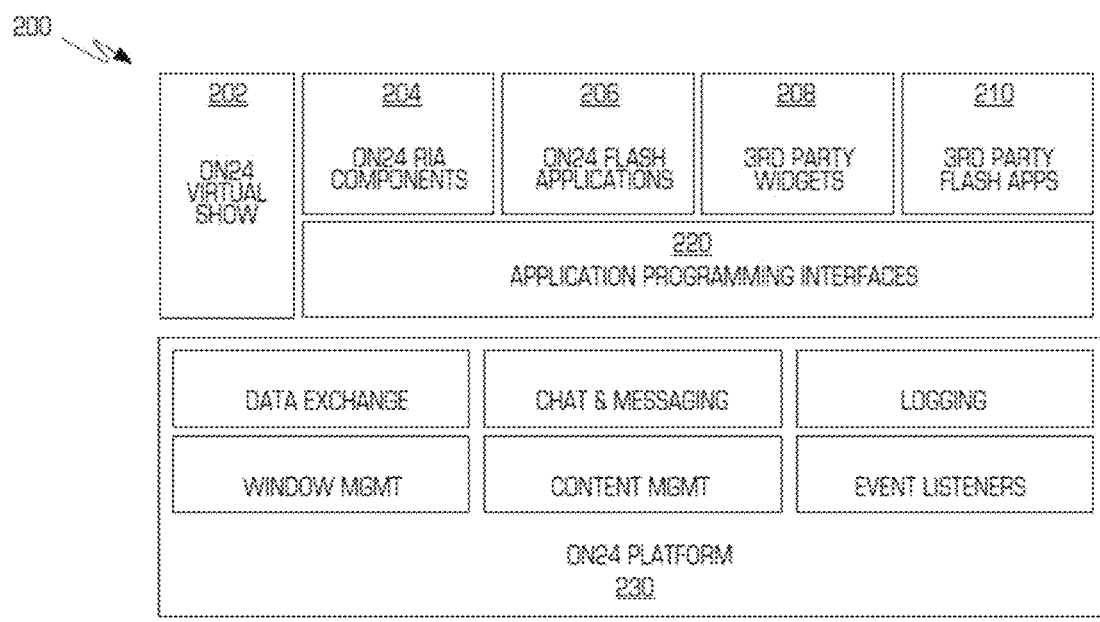
FIG. 2 is an illustration of a communication system according to one aspect of the innovations herein.

FIG. 2 shows a diagram of open console platform 200, including base platform 230. Base platform 230 includes data exchange 232, chat and messaging 234, logging 236, window management 238, content management 240, and event listening 242. Additional details related to base platform 230 are disclosed in U.S. patent application Ser. No. 11/246,033 which is hereby incorporated by reference. Open console platform 200 also includes programming interfaces 220, and in certain embodiments may include, rich internet application (RIA) components 204, flash applications 206, 3rd party components 208, a web application framework components HTML5 components, Silverlight Components, and third party flash applications 210. As described above, some embodiments may include only certain types of components or applications. Each embodiment of the present innovations is not required to include all of RIA components 204, flash applications 206, 3rd party components 208, HTML5 components, Silverlight Components, and third party flash applications 210. Instead, certain embodiments may require only one, multiple, or all of the above applications and components.

Some embodiments of open platform 200 include or are presented in conjunction with a virtual show 202. Virtual show 202 may interface and provide and receive information to and from some or all of the components or applications operating with API 220. Details related to virtual show 202 may be found in U.S. patent application Ser. No. 12/131,849, which is hereby incorporated by reference. As discussed above, open console platform may exist either with or without an associated virtual show.

Programming interfaces 220 in conjunction with base platform 230 provides a foundation for building out sophisticated, domain-specific, user-targeted communications components for delivering the customized, personalized, webcasting experience. By using an open interface, the base platform 230 is made accessible to the widest possible audience, regardless of location, device used to view it, or language. The "open" nature of the platform 200 allows third parties to develop and deploy communications, interactive, and informational components independently. This open platform 200 defines a level of programming interfaces available to webcasting communications components in the base platform 230 such as: window/layer management such as z-index, listing and controlling layers, windows, sizing, positioning, transitions; data providers including particular location, role, resources available to that role in the current location; logging including problems/errors, action/hit-tracking; and interaction with standard functionality such as launching a console like console 100 of FIG. 1, launching URL's, Briefcases survey components or components such as media component 130 or slide component 120 of FIG. 1. The programming interface 220 may also be used to standardize interfaces, both of elements from base platform 230 and components and applications created to use the programming interfaces 220. This may be done to allow a unifying look-and-feel to be applied by default to components developed by disparate sources and third parties who may never interact with each other.

Live or On-Demand Rich Media Internet Applications require complex interactivity between the various parts, or communications components, of the application. At the same time, new communications components or customization of existing communications components which may conflict in a closed system are possible, this requires communication components using programming interface 220 to create new functionality and perform its individual role without concerns of conflicts with other communications components. The communications components may also be integrated into the final presentation in a way that masks their individual and different sources, and shows the appearance of a single unified application despite the different development sources and/or times of various communication components.

The complex interaction within the various components is managed by a central "Communications Manager" object, which registers events or requests from individual components, identifies the priority of each event, and determines the callback mechanism to deliver information back to the calling component. This object then applies a layer of security filters to verify that the calling component has the appropriate permissions to access the resources it is requesting, and that it has not exceeded its quota of requests within a given time frame. Once all these filters are passed and the Communications Manager determines that the event or method being called can in fact be acted on—the event or method is allowed to proceed in a metered and organized way. Registered event listeners, or method calls return the information to the component via a callback method, including the requested information, if any, and status of the original request. In this way, the platform enables the limited resources available on the browser to be allocated with the appropriate priority and rationing so as to allow for a smooth, seamless, and integrated user experience. Contrast this organized platform approach with a mashup of components—each unaware of the other, and each competing for the limited resources available to the browser (CPU, threads, number of concurrent request to the back-end systems available, etc.), degrading performance in unpredictable and undesirable ways.

Figures 3A, 3B:
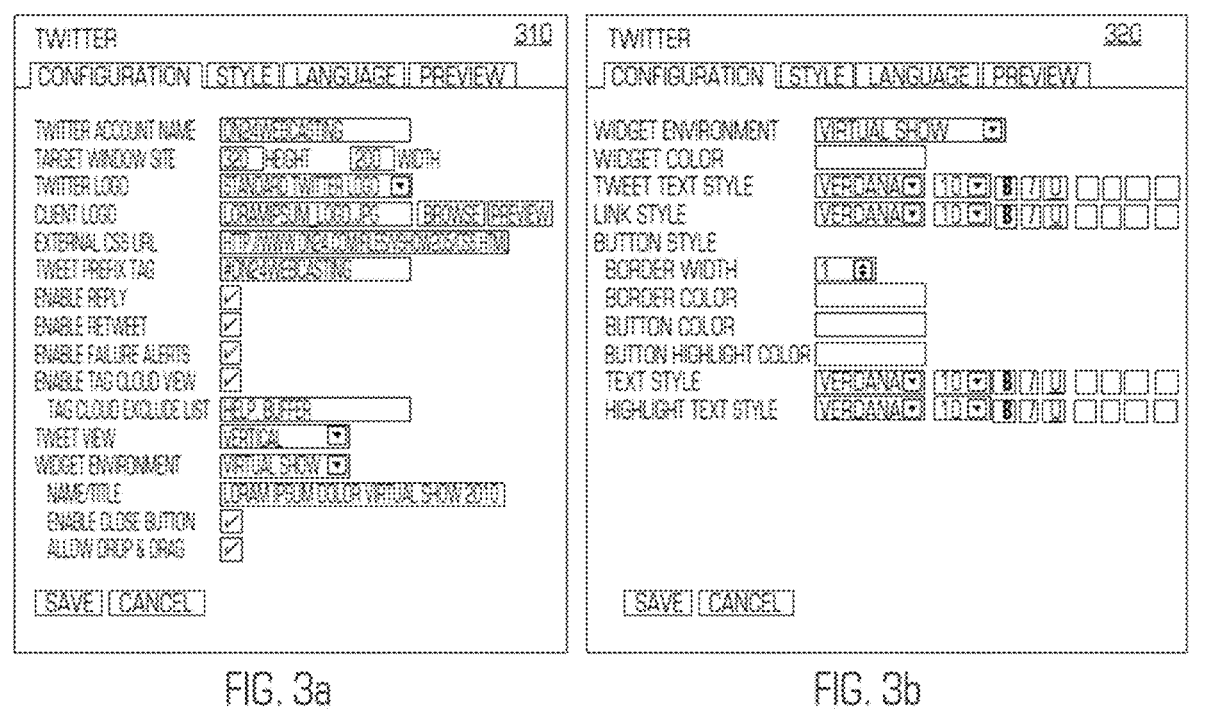
Figure 3C:
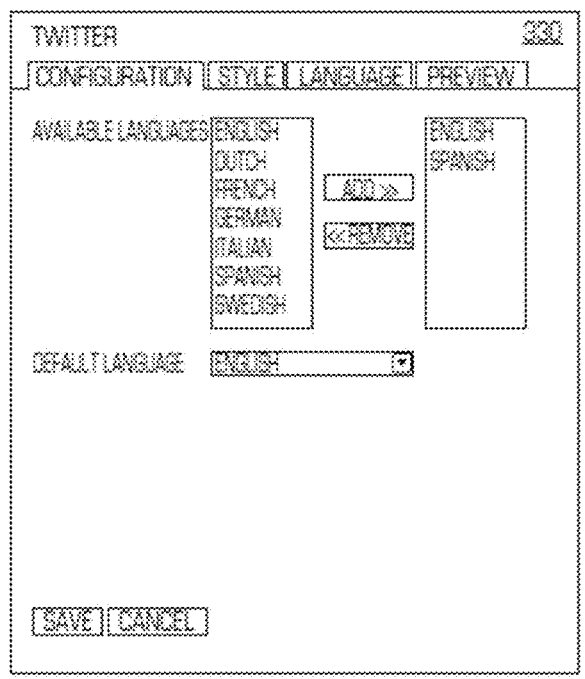
FIG. 3c is an illustration of one aspect of a rich internet application component according to one aspect of the innovations herein.
Figure 3D:
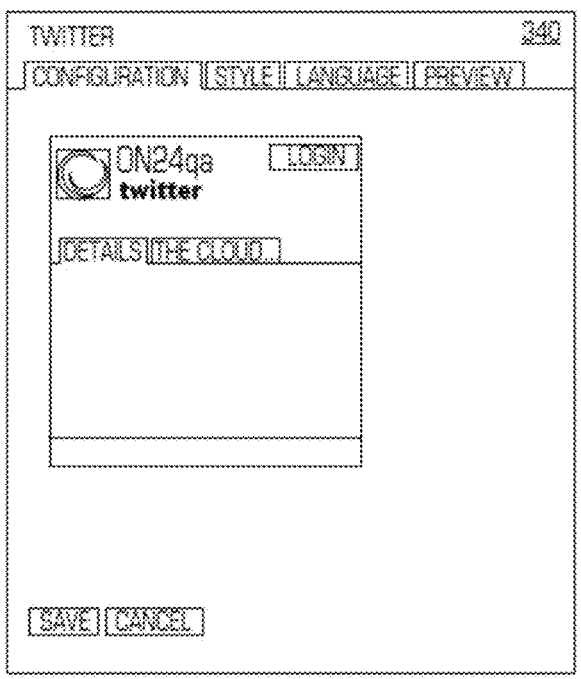
FIG. 3d is an illustration of one aspect of a rich internet application component according to one aspect of the innovations herein.
Figure 3E:
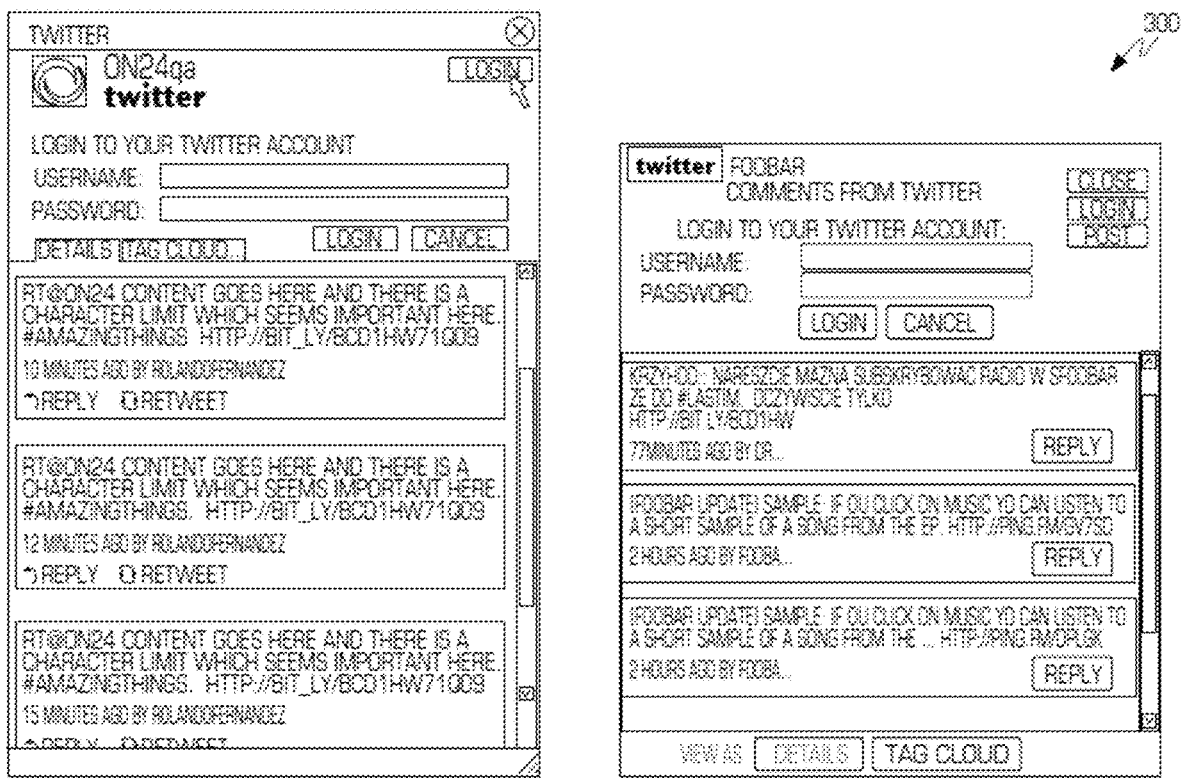
FIG. 3e is an illustration of a rich internet application component according to one aspect of the innovations herein.

FIGS. 3a, 3b, 3c, and 3d show an embodiment of console wrapper definitions which may be used to create and modify a component such as Twitter™ component 300 of FIG. 3e which may then be presented in a console such as console 100 of FIG. 1. Components designed to interact with this open platform can meet a nearly unlimited range of application needs, but may share a set of common characteristics by design.

FIG. 3a shows a potential configuration interface 310 for configuration of a component using a component container. Components may be self-configuring with interfaces such as interface 310 shown in FIG. 3a to allow both initial and subsequent modification of the use of that communications component by the creator of the component, a presenter of a presentation or virtual show, by an audience member that may be viewing the component in a console such as console 100 of FIG. 1. Each component may include different configuration settings and interfaces created to interface with the programming interface 220 of FIG. 2.

FIG. 3b shows a skin interface 320. Components may also be skinnable such that the communications components inherit the user-interface styles from the parent applications or overall console skin setting to create a unified presentation, and allow overriding them on a case-by-case basis, as needed as shown by the style settings of skin interface 320.

FIG. 3c shows language setting interface 330. Communications components may be designed to support multiple languages, and may interface with the programming interface 220 as part of a component shell to allow adding of new languages at any time to the component.

FIG. 3d shows a preview window 340 as part of the configuration shell for reviewing an interface for a communication component to be included in a console 100. The preview window may allow review and modification of any graphics, animations, or other visible or changing element of a communication console as part of the component shell.

FIG. 3e shows a communication component 300 for presentation and aggregation within a communication console 100. As described above, the communication component is designed to be as flexible and open ended as possible while operating through programming interface 220 so that each communication components may be device agnostic. This functions with programming interface 220 such that such that the communication component is designed to work on any device, computer, mobile phone, PDA, Media Player, that supports the basic platform (HTML5, Adobe Flash™, Microsoft Silverlight™, and etcetera) for Rich internet applications. As shown by Twitter™ component 300 of FIG. 3e, a component may include custom graphics, a login to an external service, and communications to and from an external service as part of the component within communications console 100. Social networking communications components may include the ability to interact in a self-contained way with other users without going to a different web site, loading another page, or leaving a communication console such as communication console 100 in any way. User networking, linking, and chat, such as through Twitter™, Facebook™, or a number of other platform integrations can be accomplished via these sorts of communications components.

Figure 4:
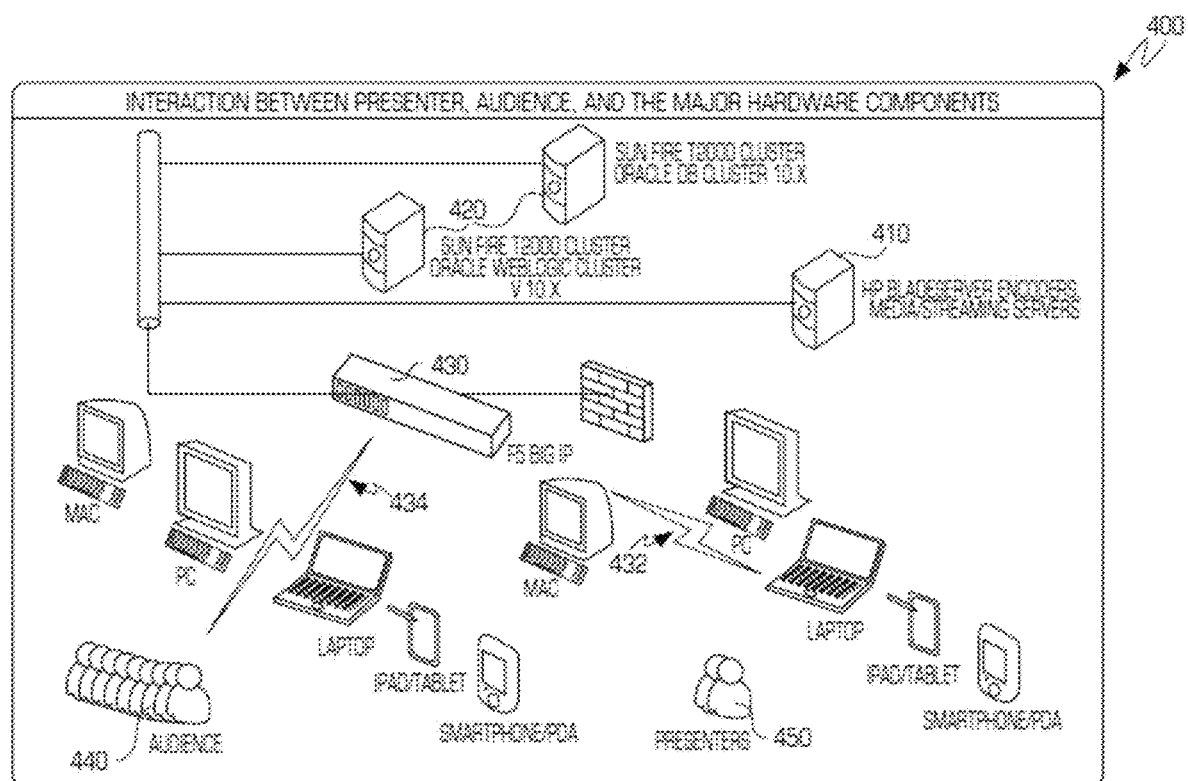
FIG. 4 is an illustration of a communication system according to one aspect of the innovations herein.

FIG. 4 shows communication console system 400 for presenting communication components as part of a communication console to an audience 440. Back end hardware components may include database hardware 420, which, in one example, may be Sun Fire T2000™ Clusters operating Oracle DB Cluster 10.x™. Back end hardware components may additionally include streaming hardware 410 such as HP™ bladeserver encoder and media/streaming servers. The back end hardware components 410 and 420 may be coupled to presenter hardware 432 and audience hardware 434 via networking hardware 430. The back end comprises a data store which may be stored on computers that house a database, or XML files to represent the data, and a middleware used by the application layer to save, retrieve and interact with this data. In the case of a live presentation or virtual show, presenters 450 and audience 440 may be connected to back end hardware at the same time to create a live presentation. Alternatively, for a recorded presentation, show, or other use of console 100, presenters may store communication modules and/or media on database hardware 420 for later use by audience 440.

As discussed above, audience hardware 434 may include any device, computer, mobile phone, PDA, Media Player that supports a basic platform (HTML5, Adobe Flash™ Microsoft Silverlight™, and etcetera) for Rich internet applications.

In one potential embodiment of communication console system 400, database hardware may include a library of communication components for use by presenters 450 with presenter hardware 432. Standard and third party communications components may be included, from which they can be picked and added to a webcast or virtual event. Once added, these communications components bring with them the interfaces to configure the properties needed by the communications component to function within the specified context.

Figure 5:
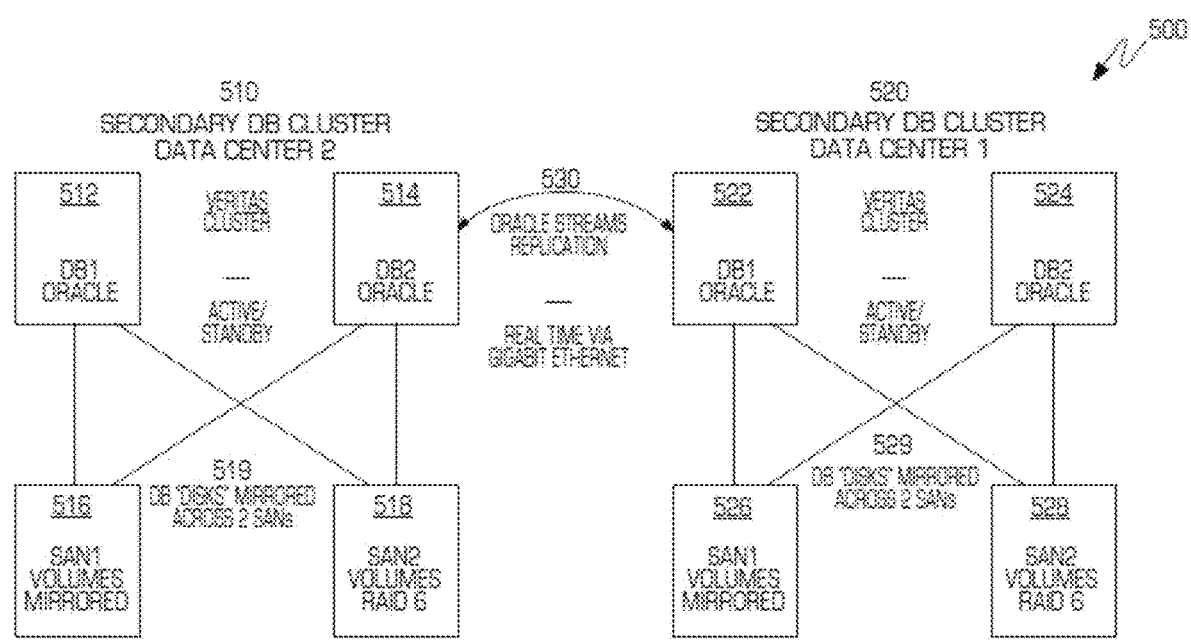
FIG. 5 is a diagram of a database for use with a communication console system according to one aspect of the innovations herein.

FIG. 5 shows data system 500 which may include database hardware such as database hardware 420 in one potential implementation. Data system 500 includes a primary data center 520 and a secondary data center 510. The first and second data centers may contain first databases (512 and 522 respectively) and second databases (514 and 524 respectively), with the data from each data center stored in first storage area networks (516 and 526 respectively) and second storage area networks (518 and 528 respectively). The data centers may be communicatively coupled by a communication link 530.

Figure 6:
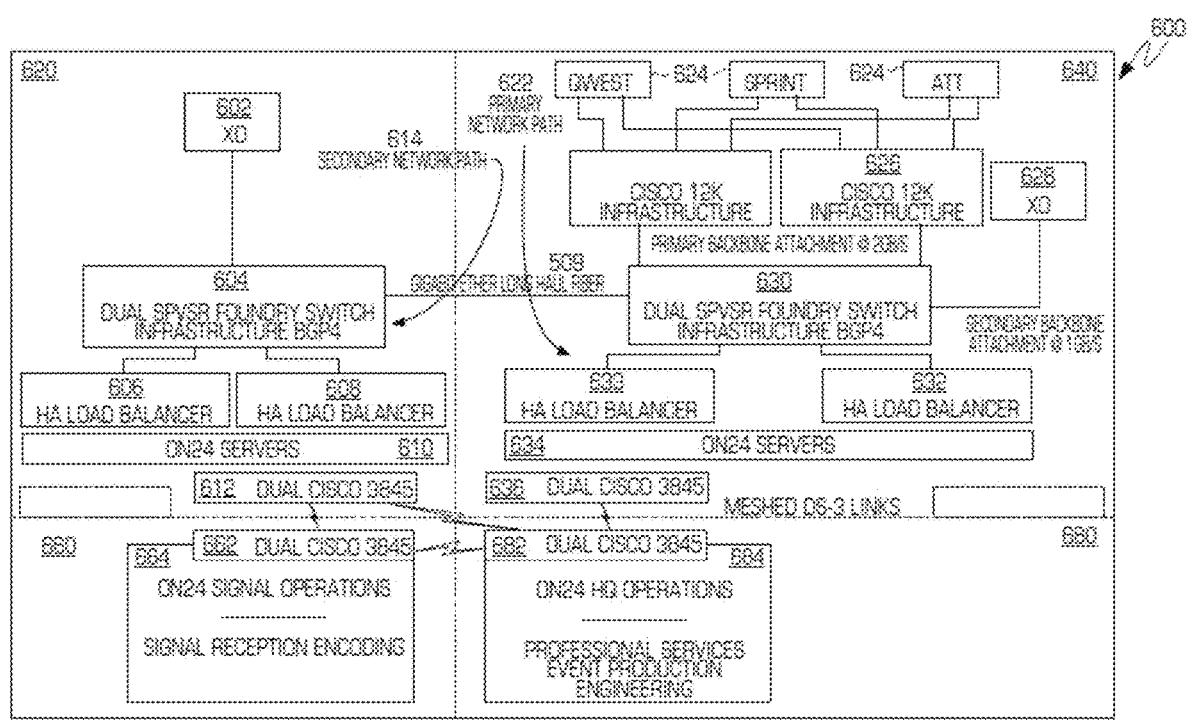
FIG. 6 is a diagram of a communication console system according to one aspect of the innovations herein.

FIG. 6 shows an alternate embodiment of a communication console system in the form of communication console system 600. Communication console system 600 may optionally be distributed such that the components are divided into different locations such as first location 620, second location 640, third location 660, and fourth location 680. Communication console system 600 may include network paths 624 from internet service providers to network infrastructure 626, and then to switch infrastructure 630. Network traffic may be divided or routed between a primary network path 622 and a secondary network path 614. The primary network path 622 interfaces with hardware 634 at second location 640 via switch infrastructure 630 which uses load balancers 632 and 633. The secondary network path may be connected to switch infrastructure 630 via communication link 609. Link 609 may be coupled to switch infrastructure 604 which uses load balancers 606 and 608 to allow network traffic to access hardware 610. Additionally, a first secondary attachment 628 may allow traffic into the system via switch infrastructure 630, and a second secondary attachment may allow network traffic into the system via switch infrastructure 604. Finally, hardware 610 and hardware 634 may communicate with service hardware 684 and signal hardware 664 by use of networking hardware 612, 636, 682, and 662, respectively, which provide communication links between first location 620, second location 640, third location 660, and fourth location 680.

Figure 7B:
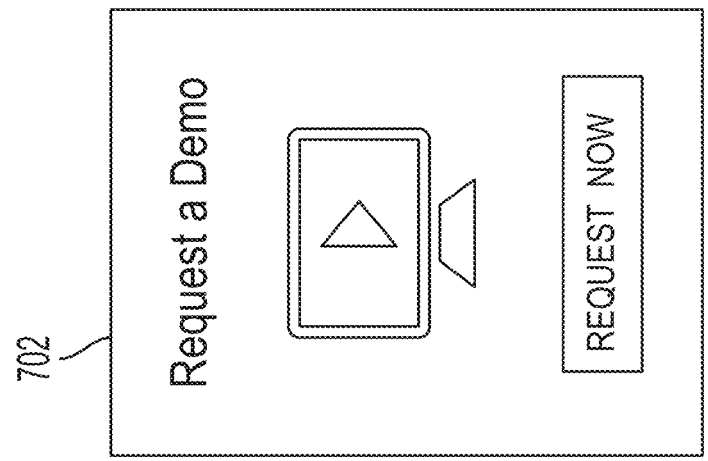
FIG. 7B illustrates an example of a request a demo widget that is part of the communication console system.
Figure 7A:
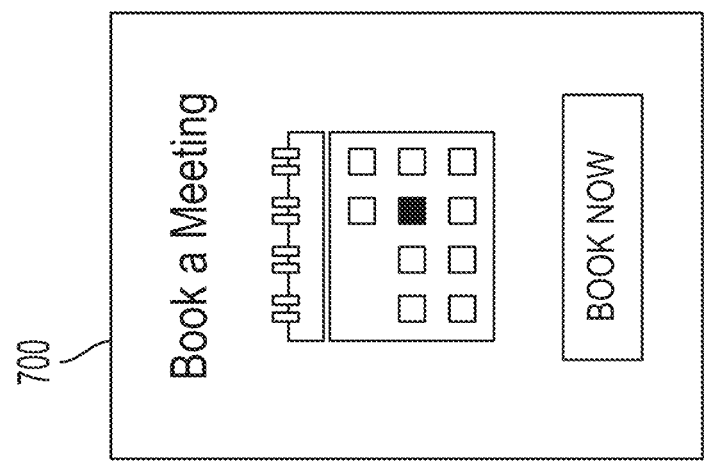
FIG. 7A illustrates an example of a book a meeting widget that is part of the communication console system.

In addition to the features set forth above, the communication console may also capture buying intent signals for each audience member and perform an action based on that intent. In one embodiment, in addition to the components and widgets mentioned above, the communication console may have a book a meeting widget 700 and a request a demo widget as shown in FIGS. 7A and 7B, respectively. Each of the these widgets 700, 702 allows an audience member to click on the widget and take an action that indicates a buying interest. For the widget in FIG. 7A, the action is to book a meeting based on the presentation being provided in the communication console while the action, for the widget in FIG. 7B, is to request a demonstration based on the presentation being provided in the communication console. Both of these action indicate buying interest of the audience member and the widgets 700, 702 capture that buying intent of each audience member.

Figure 8:
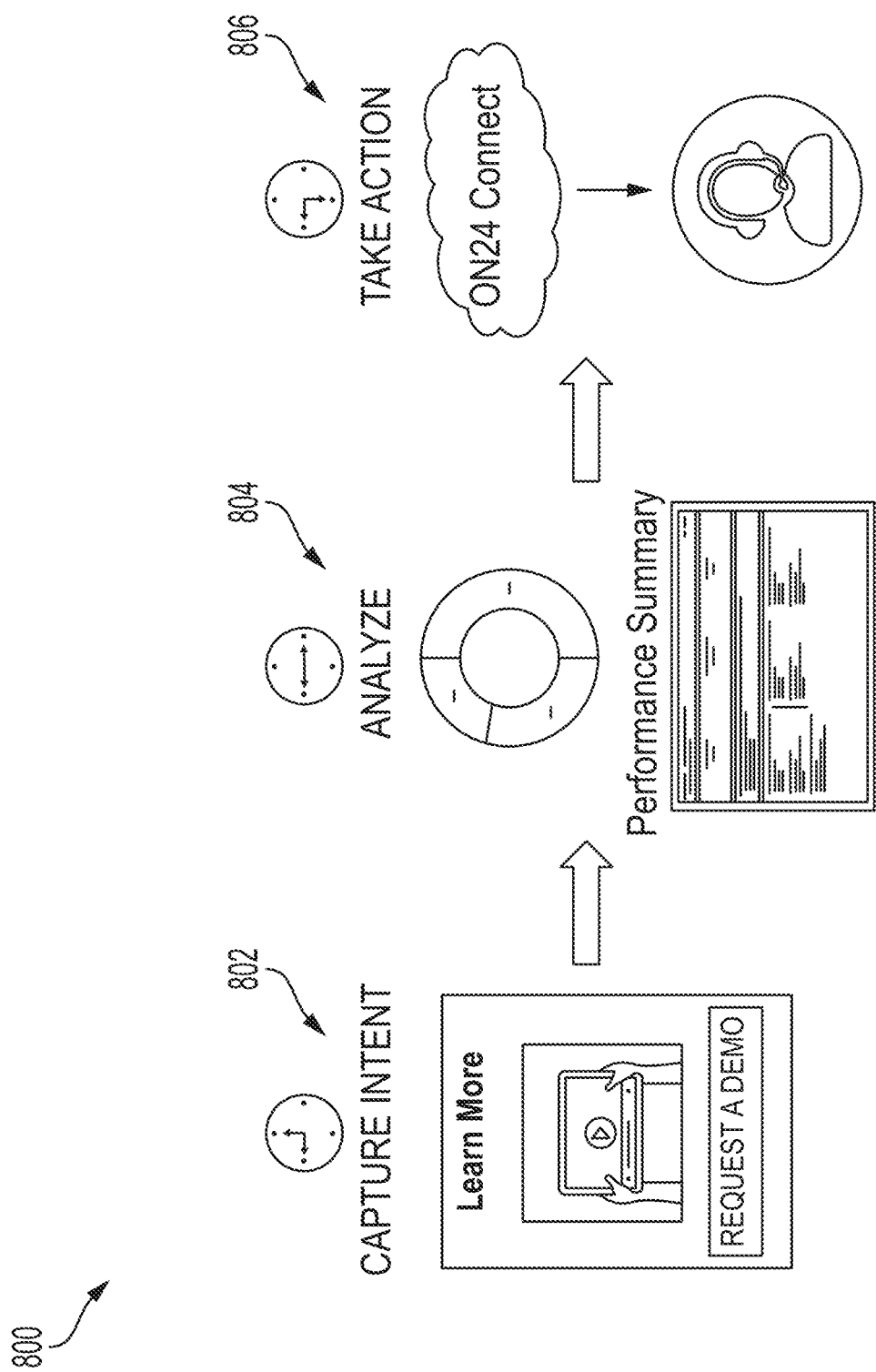
FIG. 8 illustrates a method for capturing audience buying intent signals with realtime actionable data using the communication console.

FIG. 8 illustrates a method 800 for capturing audience buying intent signals with realtime actionable data using the communication console. The method may include the buying intent capture process 802 (such as by using the widgets shown in FIGS. 7A and 7B) during an event or presentation on the communication console system. The on24 platform 230 shown in FIG. 2 may include one or more server computers with processors and memory with a plurality of lines of instructions so that the processor is configured (as a monetization component) to take action/monetize the audience buying intent signals in realtime. The method then analyzes the captured buying intent (804), such as by using the monetization component of the on24 platform. In one example, a performance summary may be generated. The method may them take an action (806) based on the processed buying intent signals. For example, the processed signals may be made available through various API's and connectors to external systems (like a CRM or a Marketing Automation Platform) in close to "real time".

Figure 9:
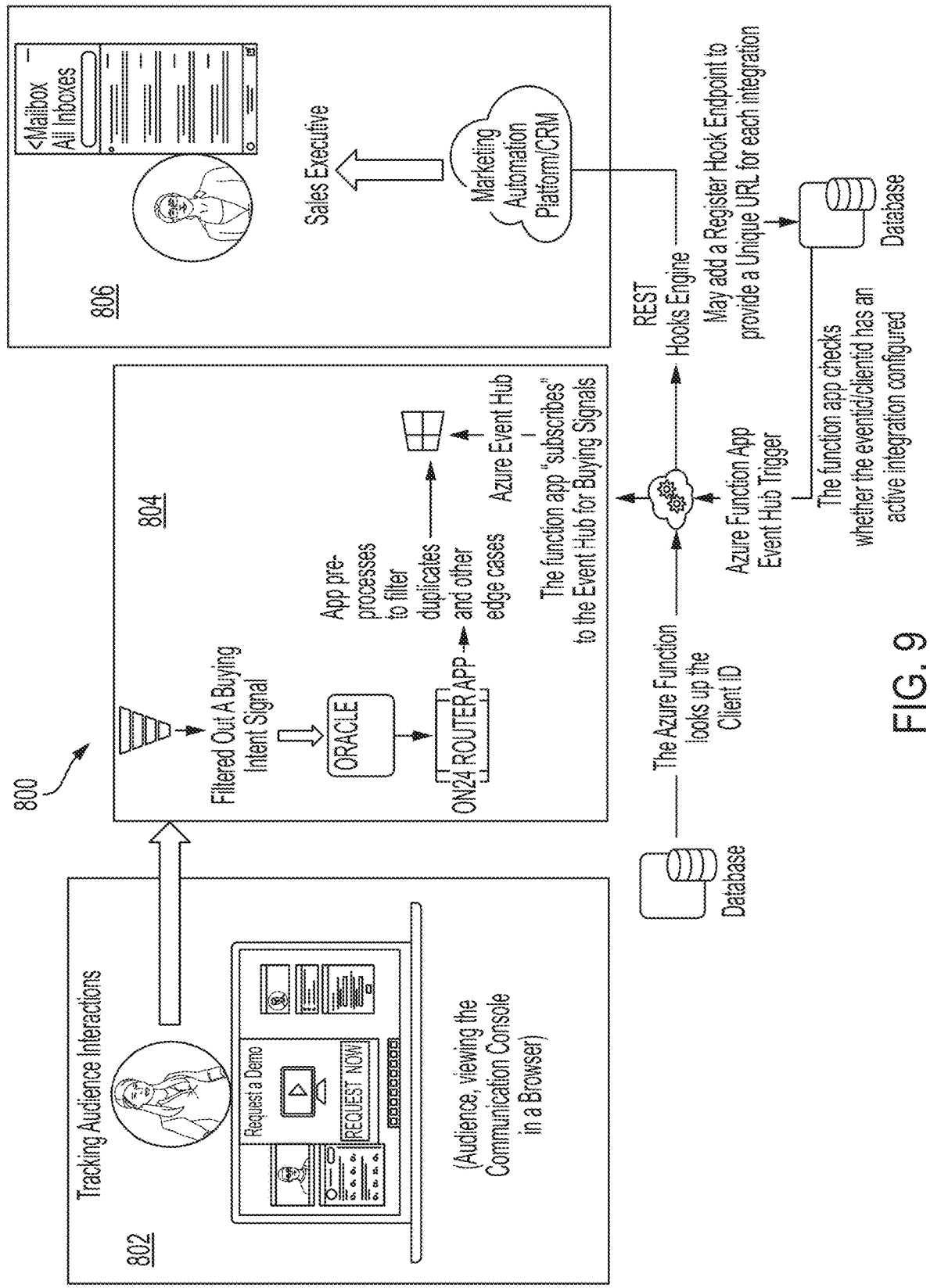
FIG. 9 illustrates more details of the method for capturing audience buying intent signals with realtime actionable data using the communication console.

FIG. 9 illustrates more details of the method 800 for capturing audience buying intent signals with realtime actionable data using the communication console. As shown, the capturing buying intent process 802 may be performed using the widgets (such as the request a demo widget 702) shown in FIG. 9) that can be clicked on by an audience member while the audience member is viewing a presentation or event using the communication console that may be displayed in a browser as discussed above. The signals/data that results from the captured buying intent of the audience member may be passed onto the monetizing component of the communication console system that performs the analysis process (804) that performs various analysis and processing processes. For example, the system may filter out a buying intent signal which may take about 3 minutes (near real time) and makes use of an commercially available Oracle DB reader and a router application or any alternative custom code that can look for changes to the data in a database, such as an Oracle database, to detect these signals. For example, in one embodiment, the router app may be a commercially available Striim apps from Striim Inc. There may be a different router app for different buying intent event types. At this stage, the code may preprocess of the buy intent data to filter duplicates and other edge cases out of the data. The method may utilize the commercially available Azure event hub and each app subscribes to the Event Hub for New Registrants. The method may then look up the client ID that causes an event hub trigger. The method may also, using the Azure function, look up whether the Event ID or Client ID in question has an active integration configuration to connect to an external system. A REST hooks engine may add a register hook endpoint to provide a unique URL for each buying intent that may be passed on external system for performing the monetization of the buying intent (806). Using the method, any buying intent captured by the widgets of the communication console and, in realtime, analyzed and can be acted on by someone like the sales executive shown in FIG. 9.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. An audience computing device comprising:
   a hardware processor;
   a memory;
   a network connection connected to the hardware processor;
   a plurality of instructions executed by the hardware processor that generate an application framework on the audience computing device, the hardware processor, the network connection and the plurality of instructions are configured to cause the audience computing device to:
   receive, over the network connection by the application framework, a communication manager;
   execute, by the hardware processor in the application framework, the communication manager;
   receive, over the network connection by the application framework, at least two communications components and a presentation component;
   execute, in the application framework using the communication manager, the at least two communications components and the presentation component;
   exchange data between the communication manager, the at least two communications components and the presentation component within the application framework during a live presentation to present the live presentation to a user of the audience computer device without downloading and installing an application; and
   manage, in the application framework using the communication manager, an interface and display of the live presentation.

2. The audience computing device of claim 1, wherein the communication manager receives requests to access the hardware processor from the at least two communication components and verifies that each communication component of the at least two communication coponents has appropriate permission to access the hardware processor.

3. The audience computing device of claim 2, wherein the communication manager receives requests to access the network connection from at least one of the at least two communication components and verifies that the at least one of the communication components has appropriate permission to access the network connection.

4. The audience computing device of claim 3, wherein the communication manager further comprises a registration module that registers the at least two communication components.

5. The audience computing device of claim 4, wherein the registration module comprises an open stack for registering an unlimited number of communication components.

6. The audience computing device of claim 1, wherein the audience computing device is a mobile telephone.

7. The audience computing device of claim 1, wherein the at least two communications components are received from the memory.

8. The audience computing device of claim 1, wherein the at least two communications components are received from the network connection.

9. The audience computing device of claim 1, wherein the presentation component further comprises one of a display background component and a screen background component.

10. The audience computing device of claim 1, wherein the at least two communication components are selected from a slide communications component, a media communications component, a menu ribbon component and a Twitter component.

11. A method for providing a live presentation using a back end computing system comprising a database of communication components and a communication manager and an audience computing device comprising a first application framework, wherein the back end computing system and the audience computing device are communicatively coupled via a network, the method comprising:
   receiving, at the audience computing device, a communication manager;
   executing, at the audience computing device within the first application framework, the communication manager to generate a live presentation without downloading and installing an application;
   receiving, at the audience computing device, one or more communication components;
   executing, at the audience computing device within the first application framework using the communication manager, the one or more communication components; and
   exchanging data between the communication manager and the one or more communication components during the live presentation.

12. The method of claim 11 further comprising communicating, by a developer computing device, a developer communication component to the database of communication components.

13. The method of claim 12 further comprising receiving, at the audience computing device, a presentation component and executing, at the audience computing device within the first application framework using the communication manager, the presentation component.

14. The method of claim 13, wherein the presentation component further comprises one of a display background component and a screen background component.

15. The method of claim 11 further comprising selecting, at the audience computing device, the one or more communication components from a slide communications component, a media communications component, a menu ribbon component and a Twitter component.

16. A system for providing an online presentation including a communications console with component aggregation comprising:
   a back end computing system comprising a database of communication components and a communication manager, the communication components including a slide communications component and a media communications component that each have a graphical interface;
   an audience computing device comprising a first application framework, wherein the back end computing system and the audience computing device are communicatively coupled via a network, the audience computing device receives and executes the communication manager within the first application framework to generate a live presentation without downloading and installing an application, and the audience computing device receives and executes the communication components within the first application framework using the communication manager and each communication component exchanges data with the communication manager within the application framework during the live presentation; and a developer computing device comprising a developer communication component, wherein the developer computing device is communicatively coupled to the back end computing system and transmits the developer communication component to the database.

17. The system of claim 16, wherein the back end computing system further comprises a database of presentation components, wherein each presentation component is executed in the first application framework to deliver the live presentation.

18. The system of claim 17, wherein each presentation component further comprises one of a display background component and a screen background component.

19. The system of claim 16 further comprising a presenter computing device comprising presentation information, wherein the presenter computing device is communicatively coupled to the back end computing system and the audience computing device, and wherein the communication manager manages receipt and display of the live presentation information through the first application framework on the audience computing device.

20. The system of claim 16, wherein the developer computing device is communicatively coupled to audience computing device, and transmits the developer communication component to the audience computing device for storage in a memory of the audience computing device.

* * * * *